Dec. 19, 1933.    L. D. SOUBIER    1,940,634
MACHINE FOR FORMING GLASS ARTICLES
Filed April 15, 1929    7 Sheets-Sheet 6
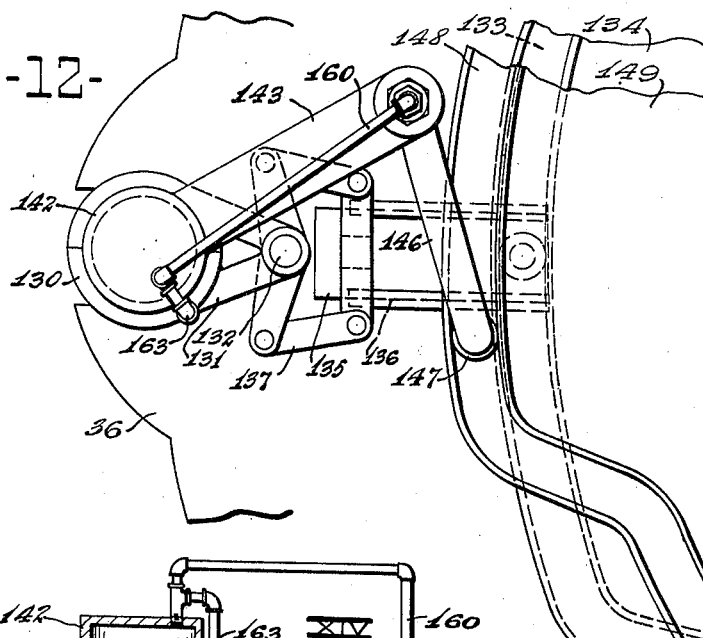
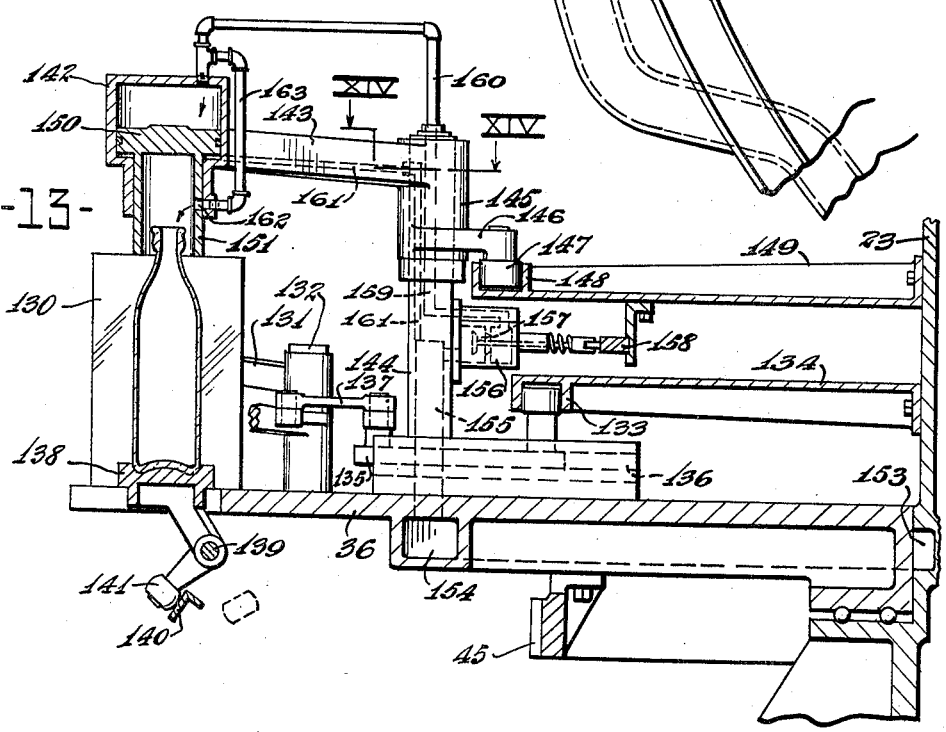
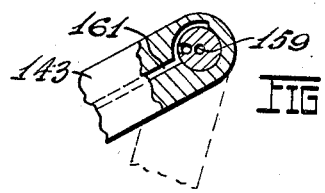
Inventor
Leonard D. Soubier
By J. F. Rule
Attorney

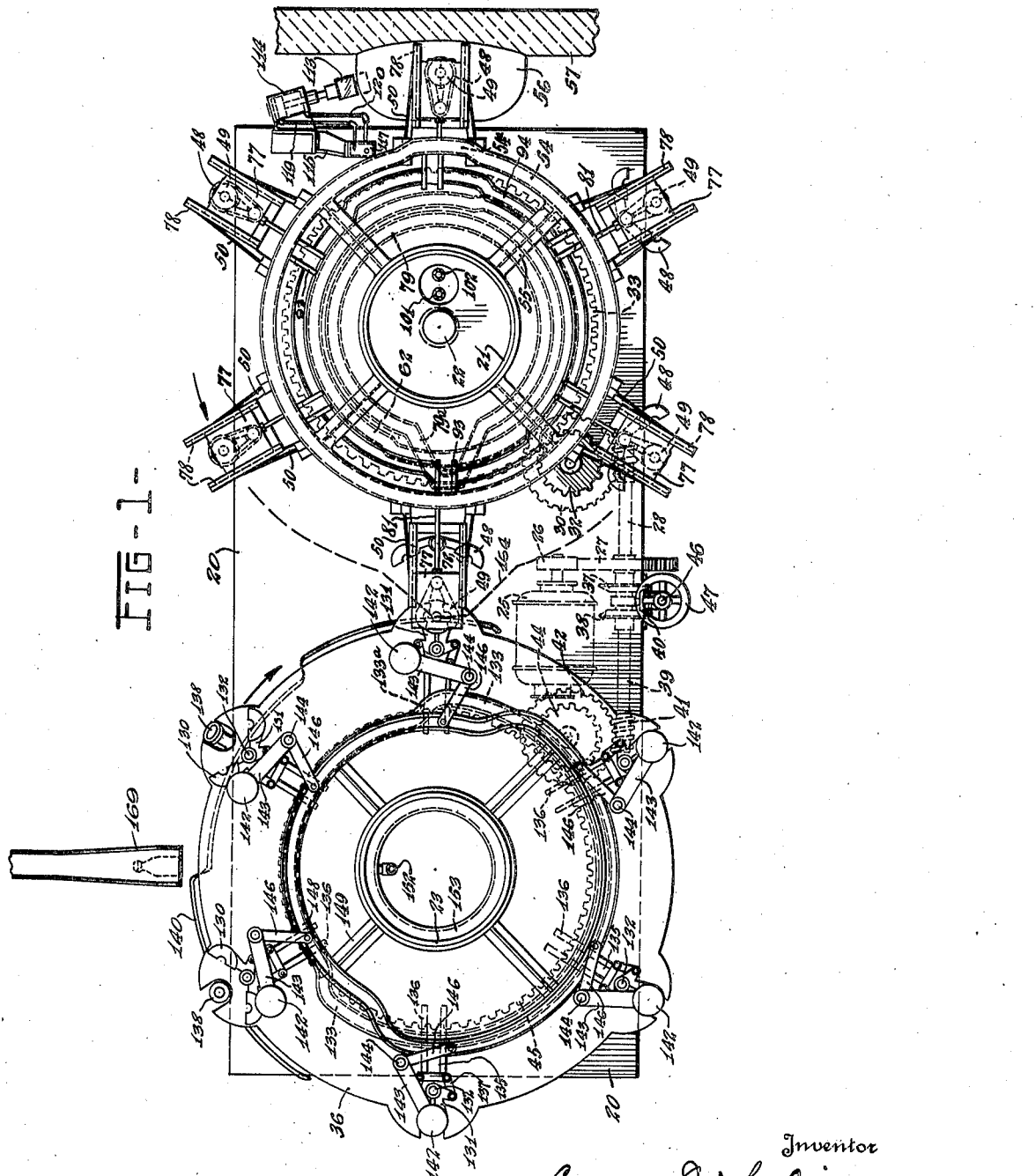

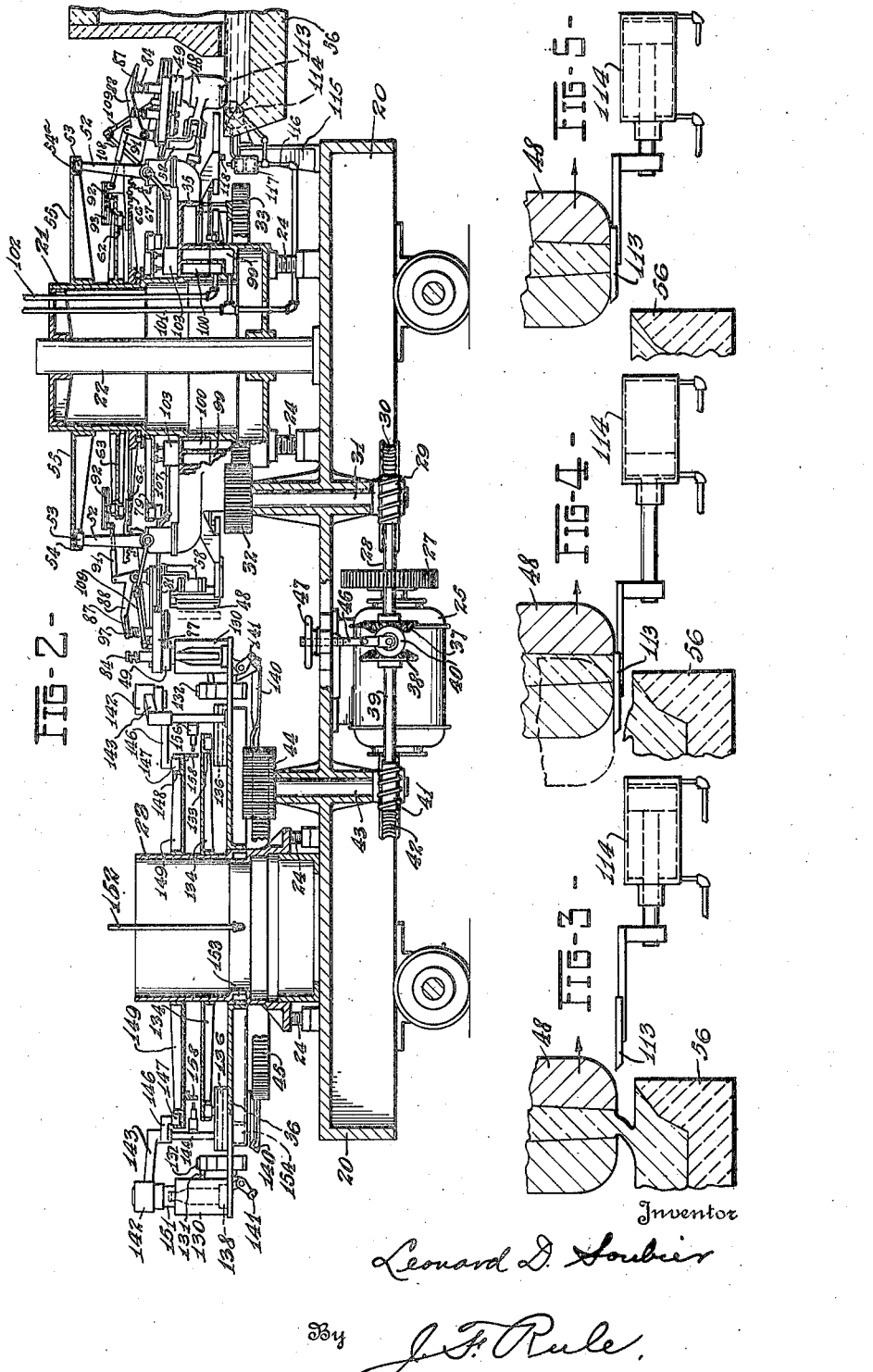

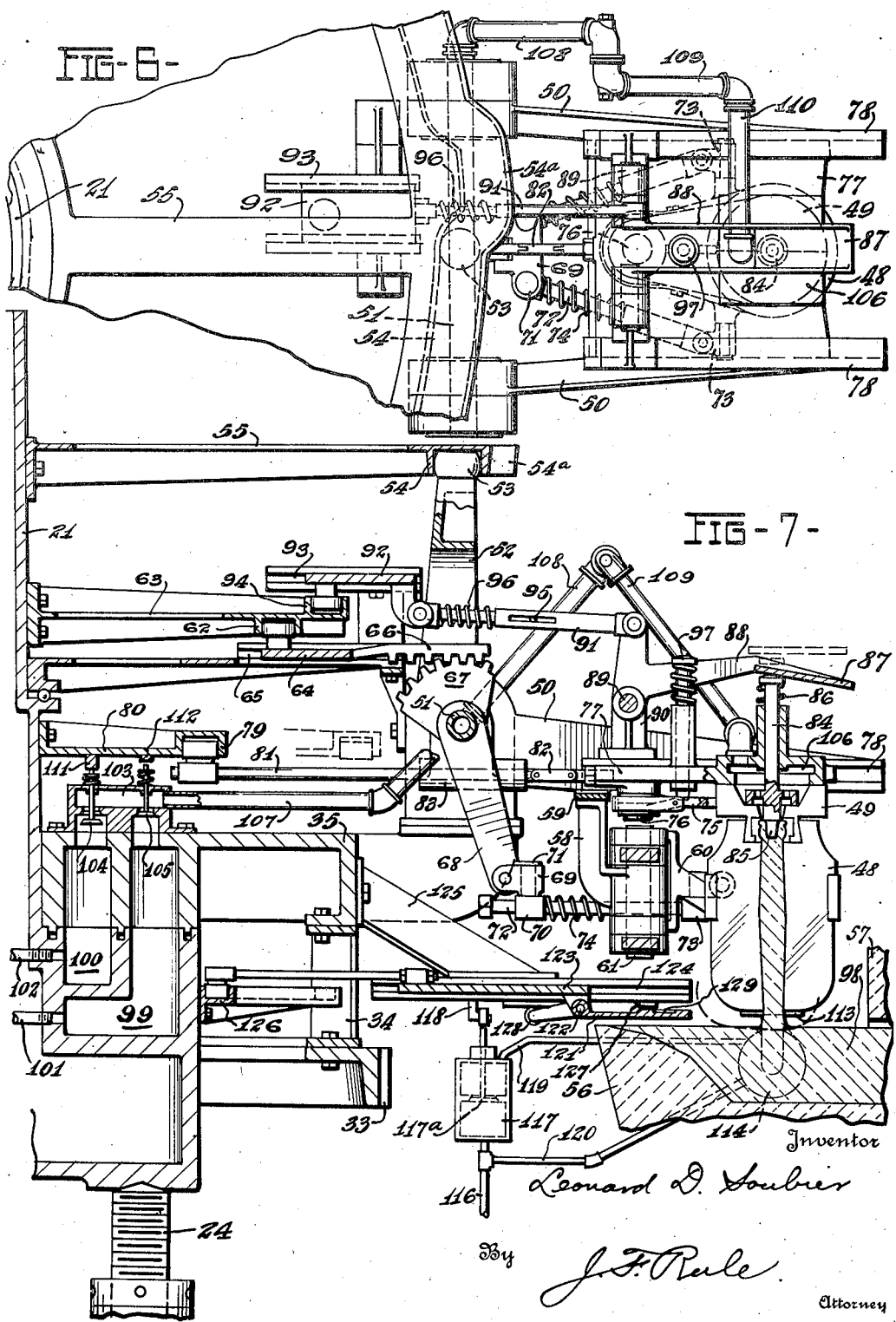

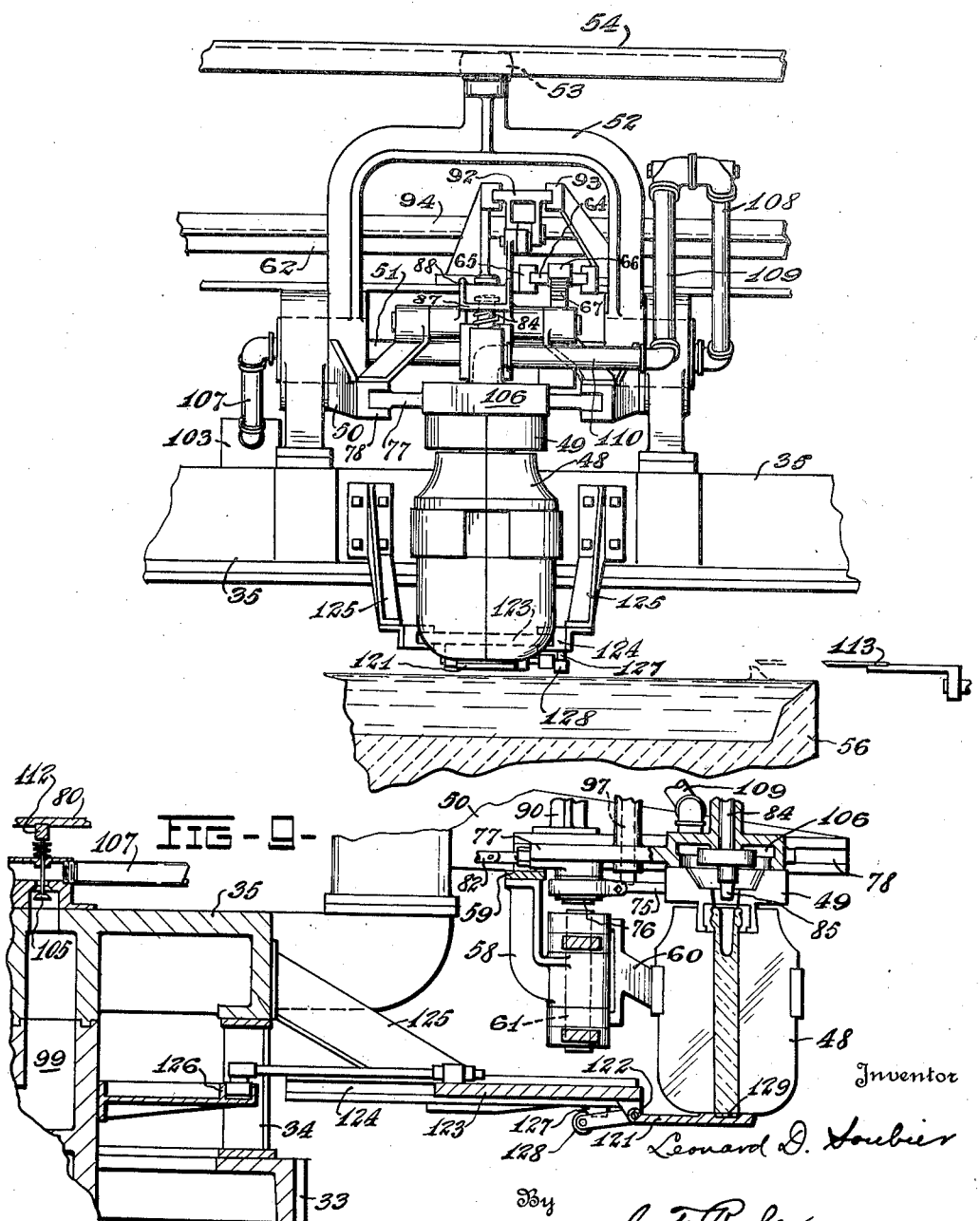

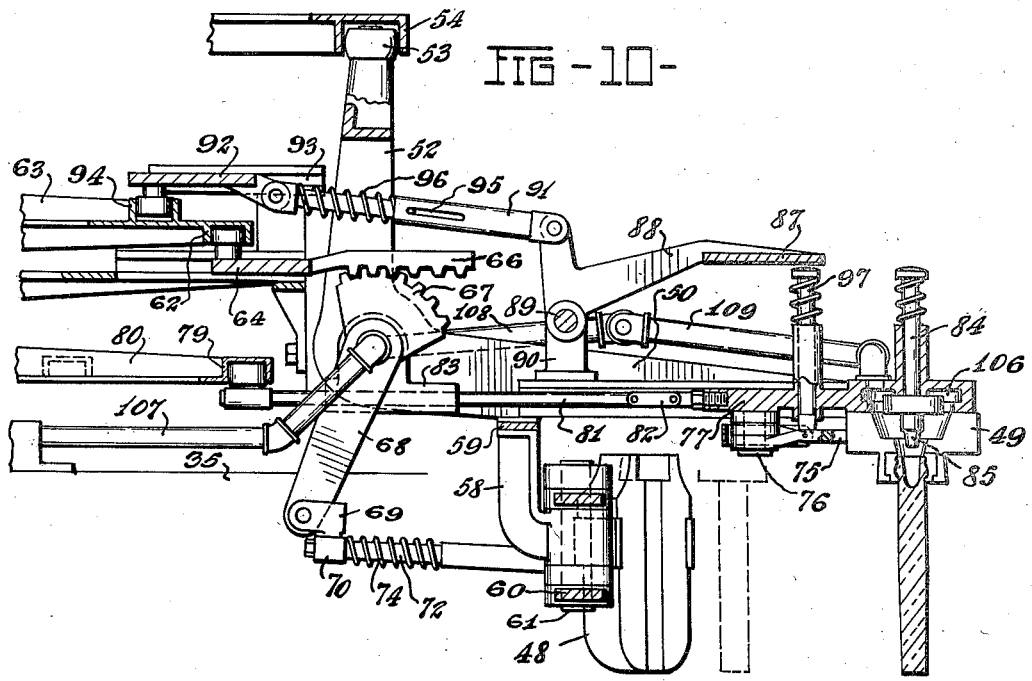
FIG-10-
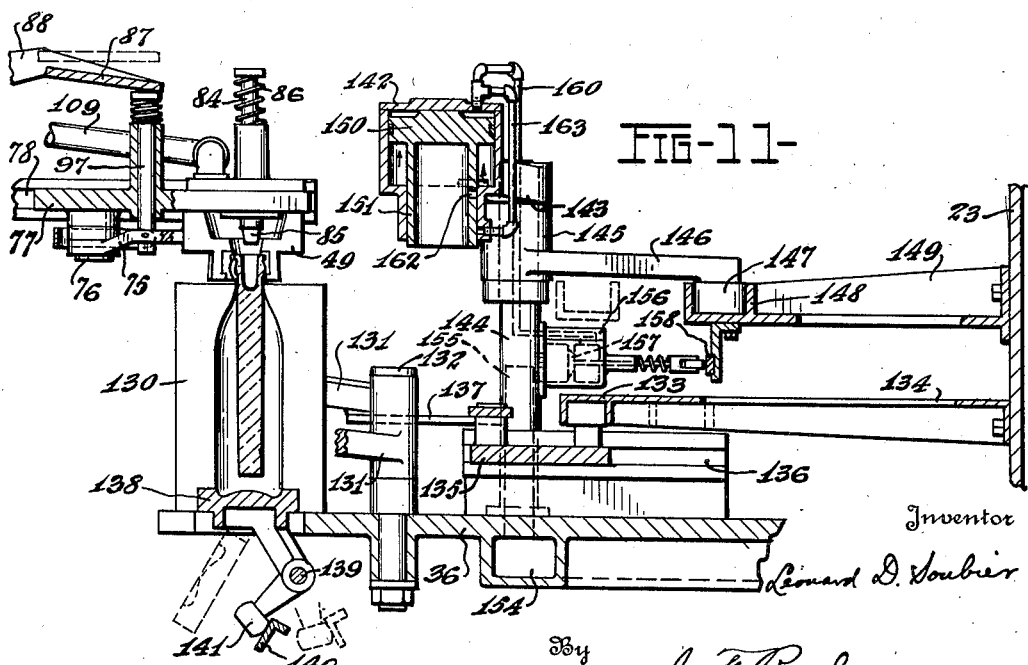
FIG-11-

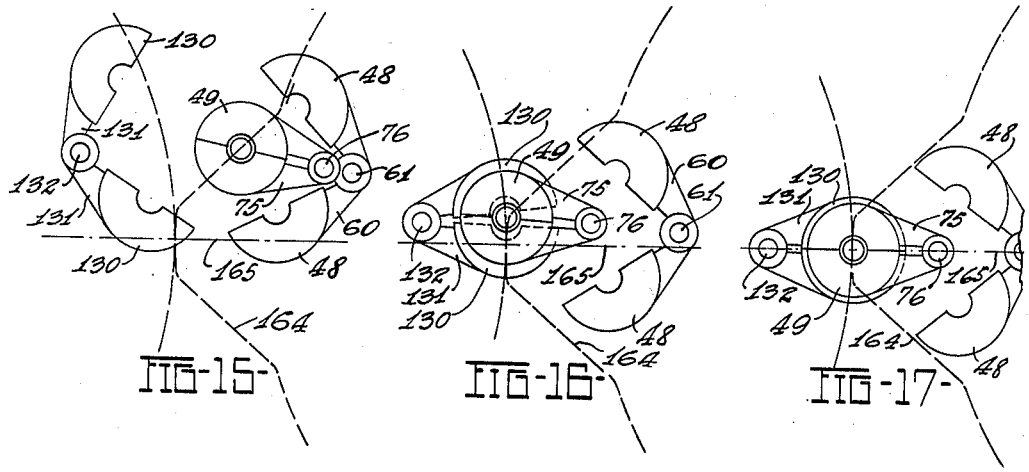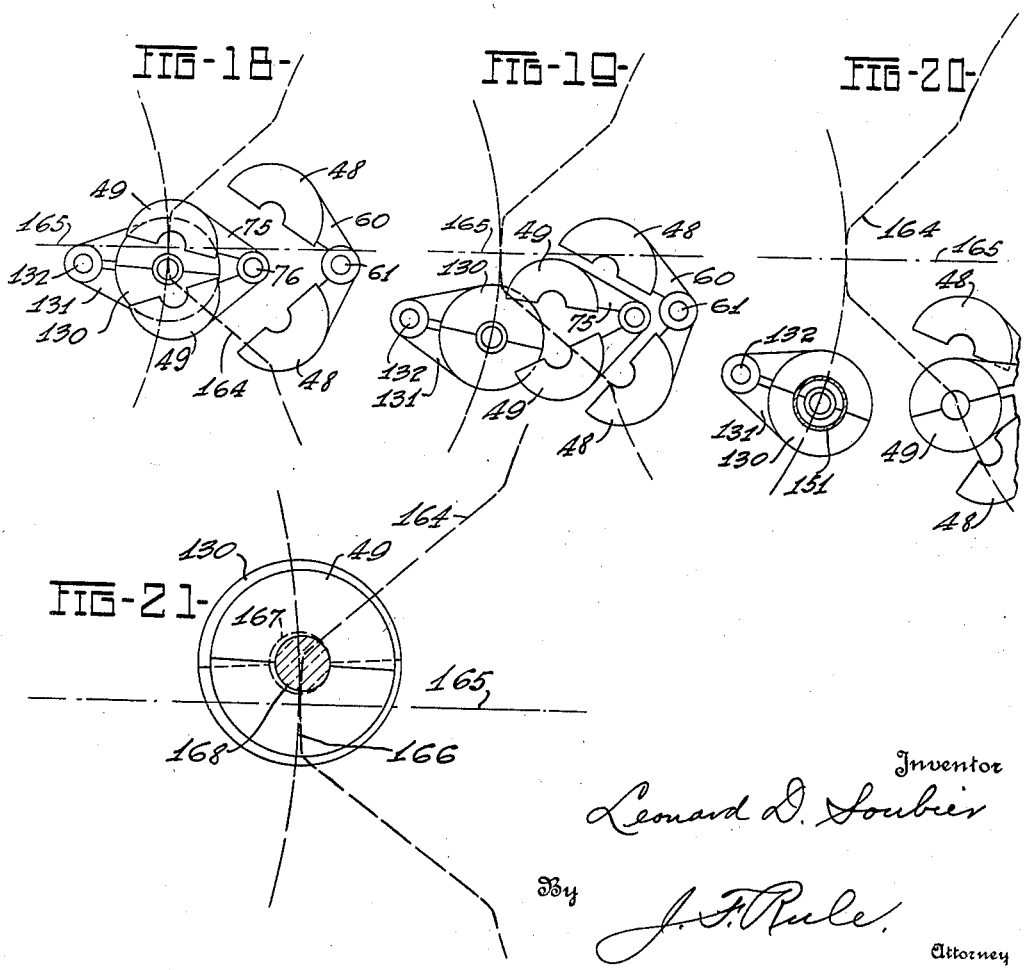

Patented Dec. 19, 1933

1,940,634

UNITED STATES PATENT OFFICE 1,940,634

MACHINE FOR FORMING GLASS ARTICLES

Leonard D. Soubier, Toledo, Ohio, assignor to Owens-Illinois Glass Company, Toledo, Ohio, a corporation of Ohio Application April 15, 1929. Serial No. 355,258

7 Claims. (Cl. 49—5)

My invention relates to machines for forming bottles, jars, or other glass articles, and is herein disclosed as embodied in a machine in which the charges of glass are introduced into a parison mold comprising a combined body blank mold and neck mold, and the formed parison while supported in the neck mold is transferred to a finishing mold in which it is blown to finished form. The machine herein shown is of the suction gathering type in which the blank molds are dipped into a supply body of molten glass and gather the charges by suction. The parison molds and the finishing molds are supported on separate tables or mold carriages arranged side by side and rotating continuously in opposite directions.

An object of the invention is to provide improved means for transferring the blanks or parisons from the parison molds to the finishing molds. More specifically, an object is to provide means whereby the transfer of the parison to the finishing mold may be effected substantially instantaneously without interrupting the rotative movement of the molds and without any deviation of either the finishing mold or the blank mold from its circular path of movement around the axis of its mold carriage.

A further object of the invention is to provide an improved mechanism for severing the parison of glass from the supply body.

A further object of the invention is to provide novel adjusting means by which the relative rotative positions of the mold carriages may be accurately adjusted to obtain a correct operation of the transfer mechanism, the adjusting mechanism being operable without interrupting the movement of the mold carriages.

Other objects of the invention will appear hereinafter.

Referring to the accompanying drawings:

Fig. 1 is a plan view of a machine embodying the principles of my invention.

Fig. 2 is a sectional elevation of the machine, certain parts being broken away.

Figs. 3, 4 and 5 are sectional detail views illustrating the operation of the cutting mechanism. Fig. 3 shows the knife just before the severing stroke. Fig. 4 shows the position of parts immediately after the severing stroke. Fig. 5 shows the knife withdrawn to the Fig. 3 position but still in contact with the mold owing to the advanced position of the mold.

Fig. 6 is a fragmentary plan view showing the dip frame carrying the parison mold and its operating mechanism.

Fig. 7 is a fragmentary sectional elevation of the mechanism shown in Fig. 6, and appurtenant parts of the machine.

Fig. 8 is a front elevation showing the dip frame and parts carried thereby.

Fig. 9 is a sectional side elevation showing the parison mold with a parison therein, the temporary bottom plate in position, the neck pin withdrawn and the parison blown in the mold.

Fig. 10 is a sectional elevation similar to Fig. 9, but showing the relation of parts after the blank mold has opened and the neck mold has been projected with the bare parison preliminary to the transfer of the blank to the finishing mold.

Fig. 11 is a sectional elevation showing the finishing mold and associated parts at the moment the transfer of the blank is taking place.

Fig. 12 is a fragmentary plan view showing the finishing mold, the blowing head therefor and their operating mechanism.

Fig. 13 is a sectional elevation of the mechanism shown in Fig. 12.

Fig. 14 is a sectional detail of the blowing head arm, the section being taken at the line XIV—XIV on Fig. 13.

Figs. 15 to 20, inclusive, are diagrammatic views illustrating the transfer of the parison from the blank mold to the finishing mold, said views showing the relative positions of the molds at successive periods during the transfer operations.

Fig. 15 shows the blank and finishing molds wide open, and the neck mold with the bare parison supported therein being projected toward the transfer position.

Fig. 16 shows the relative position of parts just before the finishing mold is completely closed.

Fig. 17 shows the position of the parts at the instant the finishing mold has completely closed and before the neck mold commences to open.

Fig. 18 shows the neck mold open.

Fig. 19 shows the neck mold partly withdrawn.

Fig. 20 shows the neck mold closed and completely withdrawn.

Fig. 21 is a diagrammatic view on a larger scale illustrating a somewhat modified operation in which the finishing mold reaches its closed position and advances a short distance with the enclosed parison before the neck mold commences to open.

Referring particularly to Figs. 1 and 2, the operating parts of the machine are mounted on a wheeled base or truck comprising a platform 20. The blank mold carriage 35 is mounted to rotate about a stationary drum or turret 21 surrounding a central post or pillar 22. The finishing mold carriage is mounted to rotate about a stationary drum or turret 23. The columns 21 and 23 are mounted for vertical adjustment on the platform by means of jack screws 24 (see also Fig. 7). The mold carriages are continuously rotated in opposite directions by a motor 25 operating thru gears 26 and 27, the latter being fixed to a worm shaft 28 carrying a worm 29 running in mesh with a worm wheel 30 fixed to a vertical shaft 31 to which is also fixed a gear 32 which runs in mesh with an annular gear 33. The gear 33 as shown in Fig. 7 is carried by brackets or posts 34 bolted to the blank mold carriage 35 so that the latter is continuously rotated.

Motion is transmitted from the motor 25 to the finishing mold carriage 36 thru differential gearing comprising a bevel gear 37 on the shaft 28, a bevel gear 38 on a shaft 39 in line with the shaft 28, and a pinion 40 intermeshing with the gears 37 and 38. A worm 41 on the shaft 39 drives a worm gear 42 fixed to a vertical shaft 43 to which is keyed a gear 44 running in mesh with an annular gear 45 on the finishing mold carriage 36. The pinion 40 is supported on a short arm mounted to rock about the axis of the shafts 28 and 39, said arm being supported at its outer end by a vertical rod 46. A hand wheel 47 has a screw threaded connection with said rod for adjusting the latter up and down. Such adjustment causes a relative rotation of the gears 37 and 38 and thereby effects a relative rotative adjustment of the mold carriages. In this manner the position of the finishing mold relative to that of the neck mold may be advanced or retarded to any extent required to effect an accurate and correctly timed operation of the molds in making the transfer. A nice adjustment can readily be effected in this manner while the machine is running.

The blank mold carriage 35 supports an annular series of parison molds, (six in the construction shown), each comprising a body blank mold 48 and a neck mold 49. Referring to Figs. 6 to 8, each parison mold is carried on a dip frame comprising horizontally disposed arms 50 pivotally mounted on a hollow shaft 51 and extending forward therefrom. Said dip frame also includes a vertically disposed yoke 52 integral with the arms 50, said yoke carrying a roll 53 running on a cam track 54 formed on the under surface of a stationary cam spider 55 fixed to the center column 21. The cam track 54, as shown in Fig. 1, is concentric with the axis of the mold carriage, except for an offset portion 54ª opposite a forehearth or extension 56 of a tank 57 which provides a continuous supply of molten glass.

As the blank mold carriage rotates, the blank molds 48 are brot in succession over the forehearth 56. As a mold reaches a position over the pool of glass in the forehearth, the cam section 54ª operates to tilt the dip frame and lower the mold into contact with the glass for gathering a charge. The blank mold is supported on the dip frame by means of a bracket 58 (see Figs. 7 and 10) secured to the under surface of a cross bar 59 extending between and attached to the arms 50 of the dip frame. The blank mold comprises horizontally separable sections carried on arms 60 mounted to swing about the axis of a vertical pivot pin 61 journalled in the bracket 58. The opening and closing movements of the blank mold are effected by a cam track 62 formed in the under surface of a stationary cam plate or spider 63 mounted on the drum 21. A slide plate 64 mounted to slide radially of the machine in guideways 65 on the mold carriage, carries a cam roll running in the track 62. The slide plate 64 is formed with a rack 66 which meshes with a segmental gear 67 pivotally mounted on the hollow shaft 51. A rock arm 68 having a fixed connection with the gear segment 67, extends downward and is pivotally connected at its lower end with a yoke 69. A pair of bearing blocks 70 are pivotally connected to the yoke by vertical pivot pins 71. Connecting rods 72 are slidably mounted in the bearing blocks 70 and extend forward therefrom, and at their forward ends have universal joint connections 73 with the blank mold arms 60. Coil springs 74 on the rods 72 tend to hold said rods in a forward position, but permit them to slide rearwardly in the bearing blocks 70, as shown in Fig. 7.

The neck molds 49 are supported on the dip frame, being mounted for horizontal movement thereon in a direction radial to the mold carriage for a purpose which will appear hereinafter. Each neck mold comprises horizontally separable sections having their meeting faces in a vertical plane radial to the mold carriage. These mold sections are carried on arms 75 mounted on a pivot pin 76 fixed to and extending downward from a slide plate 77 which is mounted to reciprocate radially of the mold carriage in guideways 78 formed in the arms 50 of the dip frame. The plate 77 and with it the neck mold, are reciprocated by means of a cam track 79 formed on a stationary cam plate 80 mounted on the drum 21. A rod 81 disposed radially of the machine carries a cam roll at its inner end running on the track 79, and at its outer end is connected thru a link 82 to the slide plate 77. The rod 81 is supported in a bearing sleeve 83 which in turn is supported on the shaft 51. It will be seen that when the rod 81 is moved lengthwise away from the center of the mold carriage, under the influence of the cam 79, the slide plate 77 and neck mold 49 will be moved outward radially of the mold carriage for transfer of the parison to the finishing mold, as hereinafter set forth.

A neck pin or plunger 84 is mounted for up and down movement in the slide 77 and is formed at its lower end with a tip 85 which, when the plunger is in its lowered position, projects into the neck mold cavity. The neck pin is lifted by a coil spring 86 and is lowered by a plate 87 formed on a bell crank lever 88, the latter pivoted at 89 in bearing brackets 90 mounted on the guides 78. The bell crank 88 is connected thru a link 91 to a slide plate 92 slidable radially in guides 93 on the mold carriage. The slide plate 92 carries a cam roll running on a cam track 94 formed on the upper face of the cam plate 63. The link 91 comprises telescoping sections having a slot and pin connection 95. A coil spring 96 tends to keep the link extended.

The plate 87 which lowers the neck pin also serves as a means to lower a pin 97 mounted for vertical movement in the slide plate 77. The lower tapered end of the pin 97 projects between the arms 75 of the neck mold and operates when said pin is lowered to spread said arms and thereby open the neck mold. It will be noted that when the blank mold is in the Fig. 7 position, the neck pin 84 is beneath the plate 87 and may be actuated thereby. When the plate 77 carrying the neck mold is projected outward to the Fig. 10 position, the neck pin is carried beyond the plate 87, and the pin 97 for opening the neck mold is brot into position beneath said plate so that when the parison is received in the finishing mold, the plate 87 may operate to open the neck mold for completing the transfer.

The means for supplying air and vacuum to the blank mold will now be described. Referring to Figs. 2 and 7, an air chamber 99 and a vacuum chamber 100 are formed in the stationary casting comprising the base of the center column 21. An air pipe 101 and a vacuum pipe 102 lead respectively to the air and vacuum chambers 99 and 100. The upper portions of the chambers 99 and 100 are formed by the rotating mold carriage 35. Mounted on the mold carriage over said air and vacuum chambers is a valve box 103 (Figs. 7 and 8) in which are valves 104 and 105 which respectively control the passage of vacuum and air thru an air line leading to a head 106 formed in the slide 77 directly over the neck mold. This air line comprises a pipe section 107 leading from the valve box to one end of the hollow shaft 51. The line extends thru said hollow shaft and thru pipe sections 108, 109 and 110 (Fig. 8) to the head 106. These pipe sections have pivotal joint connections to provide the flexibility required to permit sliding movement of the head 106 has well as its up and down movement with the dip frame. The valve 104 is actuated by a cam 111 (Fig. 7) on the cam plate 80. When said valve is opened the air is exhausted from the mold cavity for filling the parison mold. The valve 105 is in like manner controlled by a cam 112 on the cam plate 80 and when opened permits air under pressure to be transmitted from the chamber 99 to the head 106 for blowing the parison as hereinafter set forth.

The glass severing mechanism comprises a knife blade 113 actuated by a piston motor 114 which, as shown in Figs. 1 and 2, has a stationary mounting on a bracket 115 on the base plate 20 of the machine. Air for operating the motor 114 is supplied thru a branch pipe 116 (Figs. 2 and 7) leading from the air pressure pipe 101 to a valve box 117 in which is a valve 117a actuated periodically by a cam 118 (Fig. 7) to open the valve and thereby admit air under pressure to a pipe 119 leading from the valve box to the outer end of the motor cylinder. A branch pipe 120 extends from the other end of the motor cylinder directly to the pipe 116 so that constant air pressure is maintained in front of the piston. When the cam 118 opens the valve 117a, air pressure is admitted behind the piston and moves it forward, thus imparting a cutting stroke to the knife. When the valve 117a is closed, the knife is retracted.

Referring to Fig. 1, it will be seen that the blank mold carriage is rotating in a counterclockwise direction, as indicated by the arrows, so that each blank mold after receiving a charge of glass and while still over the pool of glass, is moving toward the stationary knife blade 113. As a mold is lifted from the pool its lower surface is brot into line with the knife blade (see Fig. 3). At this point the motor 114 operates to shoot the blade across the bottom of the mold, thereby severing the glass. It will be noted that this severing action is produced by the combined movement of the traveling mold and the forward movement of the knife blade, said movements being in opposite directions. After severance, the blank mold continues its movement to the full line position, (Fig. 4). The knife is then retracted (Fig. 5) while still beneath the advancing mold, after which the mold passes on beyond the knife.

Mold closing plates 121 (Figs. 7 and 9) individual to the blank molds, are each brot into operation after the corresponding blank mold has passed beyond the tank, to close the lower end of the mold. Each plate 121 has a pivotal connection 122 with a slide plate 123 mounted to reciprocate radially of the mold carriage in guides 124 secured to the carriage by brackets 125. The reciprocating movements of the slide 123 are effected by a stationary cam 126. When the plate 121 is retracted it can swing down a short distance about its pivot to a position below the lower end of the mold. As the slide plate 123 is moved outward to position the closing plate 121 beneath the mold, a cam lug 127 on the guide 124 engages a roll 128 on an extension of the slide plate and tilts the latter upward into engagement with the mold. The mold closing plate is formed with a recess 129 which registers with the mold cavity so that when the parison is blown in the blank mold, as hereinafter mentioned, the glass is forced downward into the depression 129. This serves to eliminate or reduce the usual cut-off scar.

The finishing molds 130 (Figs. 1, and 11 to 13) are symmetrically arranged on the mold table or carriage 36. Each finishing mold comprises separable sections having arms 131 hinged to swing about a pivot pin 132. The opening and closing movements of the finishing mold are controlled by a cam track 133 formed in the lower face of a cam spider 134. A slide plate 135 is mounted to reciprocate radially of the mold carriage in guides 136 on the carriage and carries a cam roll running on the track 133. Said plate is connected thru links 137 to the mold arms 131. A finishing mold bottom plate 138 is pivotally mounted for tilting movement about the axis of a shaft 139. The position of the mold bottom is controlled by a stationary cam 140 on which runs a cam roll 141 shaped to lift the mold bottom prior to the closing of the finishing mold around a parison and to permit the mold bottom to drop by gravity to the dotted line position (Fig. 11) for discharging the bottle when the finishing mold opens.

The means for blowing the parison to its finished form in the finishing mold comprises a blowing head 142 (Figs. 11 to 13) carried at the outer end of a horizontally disposed rock arm 143 mounted to swing about the axis of a vertical post 144 supported on the mold carriage. The rock arm 143 is formed with a bearing sleeve 145 journalled on the post 144. An arm 146 extending from said sleeve carries a cam roll 147 running in a stationary cam track 148 formed in a cam plate 149 mounted on the column 23. The cam 148 is shaped to swing the blowing head over the finishing mold after a parison has been enclosed therein. Said head is in the form of a piston motor and has therein a piston 150 with a cylindrical extension 151 which, when the piston 150 is moved downward, seats on the upper face of the finishing mold and surrounds the neck of the parison which extends above the mold.

Air under pressure for blowing the parison in the finishing mold is supplied thru a pipe 152 (Fig. 2) which communicates with an air chamber 153 formed in the drum 23, said chamber being in communication with a chamber 154 (Figs. 11 and 13) formed in the mold table 36. An air passage 155 extends upward from the chamber 154 thru the post 144 to a valve box 156 in which is a valve 157 actuated by a cam 158 on the cam plate 149. When the valve 157 is opened, air pressure is admitted to an air line 159 extending upward thru the post 144 and continued thru a pipe 160 which opens into the blowing head above the piston 150. Air pressure is maintained continuously beneath the piston 150 thru an air line 161 extending from the passageway 155. When the valve 157 is opened and air pressure admitted above the piston, the cylinder 151 is lowered to seat on the finishing mold. In this position a port 162 in said cylinder is brot into register with a branch pipe 163 which leads from said port to the pipe 160 so that air under pressure is admitted thru said port and serves to blow the parison to finished form in the mold.

The operation of the machine is as follows:

The motor 25 (Figs. 1 and 2) operates thru the gearing to rotate the blank mold carriage 35 and the finishing mold carriage 36 continuously in opposite directions and at the same angular speed so that the adjacent sides of the mold carriages are moving in about the same direction and at the same speed. The rotation of the blank mold carriage brings the blank molds 48 in succession to a position over the glass in the tank 56. As the blank mold reaches this position (see Fig. 7) the dipping frame 50, 52 which supports the blank mold and neck mold, is tilted downward about the axis of the shaft 51 by means of the operating section 54ª of the cam track 54. The blank mold is thus lowered into contact with the glass as indicated by dotted lines in Fig. 7. The neck pin 84 is at this time in its lowered position with the tip 85 projected into the neck mold, said pin being held in such position by the plate 87 under the influence of the cam 94. When the mold is thus brot into contact with the glass the valve 104 is opened by the cam 111, thereby connecting the vacuum chamber 100 with the mold cavity thru the line 107, 108, 109 and 110, so that a charge of glass is drawn into the parison mold. The dip frame then operates to lift the mold away from the pool of glass to the position indicated in Fig. 3. The piston motor 114 now operates to project the knife 113 and cause it to shear across the bottom of the advancing mold, thereby severing the glass. This operation of the motor 114 is caused by the cam 118 (Fig. 7) opening the valve 117ª and supplying air to the motor thru the pipe 119. The parts are now in the Fig. 4 position. As the mold advances beyond the tank, the knife is retracted as shown in Fig. 5.

After the blank mold has passed beyond the gathering tank, the mold bottom closing plate 121 is projected forward by its cam 126 to a position directly beneath the mold and swung up tightly against the mold by the cam 127, with the recess 129 in said plate in register with the mold cavity. About the time the plate 121 is brot into position, or shortly before, the valve 104 is closed so that the suction at the mold is discontinued. After the plate 121 is in position, the valve 105 is opened by its cam 112 to admit air under pressure to the head 106. The neck pin 84 is also withdrawn so that air pressure is applied to the initial blow opening which has been formed by the neck pin, thereby compacting the glass in the mold and causing it to fill the cavity 129 in the bottom plate 121. This air pressure may be discontinued after a short interval. Under certain conditions and in making some kinds of ware this initial blowing operation may be omitted.

The parison mold including the neck mold and blank mold remains closed during its travel with the mold carriage until it nears the transfer position. The blank mold now opens leaving the bare parison suspended from the neck mold as it approaches the transfer point. The corresponding finishing mold 130 is also open at this time, as shown in Fig. 15, and approaching the transfer point. The cam track 133 which controls the opening and closing movements of the finishing mold comprises an operating section 133ª (Fig. 1) operative to close the finishing mold, bringing it to its fully closed position just as the center line of said mold reaches the line joining the axes of rotation of the mold carriages. By the term "center line" of a mold is meant the vertical line extending thru the center of the mold cavity if the mold is closed or which would extend thru the center of the mold cavity if the mold were closed. The finishing mold 130 commences its closing movement about the time the Fig. 15 position is reached. At this time the blank mold 48 is opening or has opened under the control of the cam 62, and the neck mold 49 with the bare blank suspended therefrom is being projected radially outward from the center of the machine under the control of the operating section 79ª of the cam 79. It will be noted that the path of movement of the neck mold is the component of its movement radially of the machine, effected by the cam 79ª, and its movement with the rotating mold carriage. The path of the center of the neck mold is represented in Figs. 15 to 21 by the broken line 164. The center line of the machine, namely, the line joining the axes of the mold carriages is indicated by the broken line 165.

As the mold carriages continue to rotate, the molds are brot from the Fig. 15 position to the Fig. 16 position. During this stage of their movement, the blank mold 48 remains open, the finishing mold 130 is closing and almost reaches a closed position, and the neck mold has continued its outward movement radially of the mold carriage and just reaches the limit of said outward movement. The center of the neck mold has not at this point (Fig. 16) reached the center line 165.

Fig. 17 shows the parts advanced to a position in which the axis of the blank mold center intersects the center line 165. The finishing mold 130 at this point has just reached its fully closed position so that the parison, still supported in the neck mold, is enclosed in the finishing mold which is now directly beneath and in alignment with the neck mold. As soon as the finishing mold is fully closed, the neck mold commences to open.

Fig. 18 shows the molds advanced a short distance beyond the Fig. 17 position. During this advance, the neck mold 49 has opened a considerable distance but has not yet commenced its return movement toward the axis of the blank mold carriage. During the movement from the Fig. 18 to the Fig. 19 position, the open neck mold moves radially inward toward the center of the mold carriage. During the travel from the Fig. 19 to the Fig. 20 position, the neck mold is further retracted and also is closed by its cam.

In the practical construction and operation of machines of this type, it is sometimes desirable to fully close the finishing mold with the blank therein, an appreciable length of time before the neck mold commences to open. This is illustrated diagrammatically in Fig. 21, wherein the finishing mold 130 is shown entirely closed before its center has reached the line 165 connecting the axes of the mold carriages. The neck mold 49 which is also closed, is at this point slightly eccentric to the finishing mold, having reached its fully projected position as indicated by the line 164. The neck mold remains closed until its center reaches a point 166 beyond the center line 165. During the travel of the molds from the position shown in Fig. 21 until the center of the neck mold reaches the point 166, both the neck mold and finishing mold remain closed and travel in arcuate paths. The arc in which the center of the finishing mold travels is concentric with the axis of the finishing mold carriage, while the arc in which the neck mold travels is concentric with the axis of the blank mold carriage. These arcs as shown are tangent at the point at which they are intersected by the center line 165 of the mold carriages. Owing to the short length of these arcs as compared to their radii, there is only a very slight divergence between them. These radii are preferably of the same length so that the finishing mold and neck mold are travelling at the same speed. The diameter of the finishing mold cavity at the neck thereof, as indicated by the circle 167, is slightly larger than the diameter of the parison 168. This permits the slight relative movement of the neck mold and finishing mold which takes place during the travel of the molds from the point at which the finishing mold is fully closed to that at which the neck mold commences to open, without causing any shearing action or deformation of the parison.

After the finishing mold with the enclosed parison has passed beyond the transfer position, the cam 148 operates to swing the blowing head 142 over the mold as shown in Fig. 12. The valve 157 (Fig. 13) is then opened by its cam 158 admitting air pressure above the piston 150 and lowering the sleeve 151 onto the finishing mold, said sleeve surrounding the protruding neck of the parison. This downward movement of the sleeve opens the port 162 to the air pressure pipe 163 so that air under pressure is admitted and blows the parison to its finished form. After the air pressure has been maintained a suitable length of time the valve 157 is closed, permitting the constant air pressure beneath the piston 150 to lift the piston. The cam 148 then operates to swing the blowing head inward away from the mold. Shortly after this, the finishing mold is opened by its cam 133 as indicated in Fig. 1. The finished bottle is now supported on the bottom plate 138, said bottom plate being held up by the cam 140 until the discharging position is reached, when the bottom plate is permitted to tilt so that the bottle drops from the machine into a chute 169.

Modifications may be resorted to within the spirit and scope of my invention.

What I claim is:

1. A machine for forming glass articles, comprising the combination of a blank mold carriage and a finishing mold carriage arranged side by side, means for continuously rotating said carriages in synchronism about vertical axes at the same angular velocity, a body blank mold, a neck mold above and in register therewith, said molds mounted on the blank mold carriage for continuous rotation therewith, a finishing mold on the finishing mold carriage and rotating continuously therewith, means cooperating with the blank mold and neck mold to form a parison of glass therein, means for opening the blank mold and leaving a bare parison of glass suspended from the neck mold, said neck mold and finishing mold being arranged to be brot simultaneously to a transfer position in which their center lines coincide and intersect a center line joining the axes of the mold carriages, said mold center lines at said point of coincidence being equally distant from said axes and their paths of movement at and adjacent to the center line of the mold carriages being concentric with the axes of said carriages respectively, means for closing the finishing mold around the parison as the molds approach the transfer position so that the finishing mold is closed when it reaches said transfer position, and means for opening the neck mold after the finishing mold has closed.

2. A machine for forming glass articles, comprising the combination of a blank mold carriage and a finishing mold carriage arranged side by side, means for continuously rotating said carriages in synchronism about vertical axes at the same angular velocity, a body blank mold, a neck mold above and in register therewith, said molds mounted on the blank mold carriage for continuous rotation therewith, a finishing mold mounted on the finishing mold carriage for continuous rotation therewith, means cooperating with the blank mold and neck mold to form a parison of glass therein, means for opening the blank mold and leaving a bare parison of glass suspended from the neck mold, said neck mold and finishing mold being arranged to be brot simultaneously to a transfer position in which their center lines coincide and intersect a center line joining the axes of the mold carriages, said mold center lines at said points of coincidence being equally distant from said axes, means controlled by the rotation of the mold carriages for closing the finishing mold around the parison as the molds approach the transfer position, means for opening the neck mold after the finishing mold has closed, the closing movement of the finishing mold being completed substantially as its center line reaches the center line of the mold carriages, and the opening movement of the neck mold being commenced simultaneously with the completion of the closing movement of the finishing mold.

3. In a machine for forming glass articles, the combination of a blank mold carriage, a blank mold thereon, a finishing mold carriage, a finishing mold thereon, means for continuously rotating said carriages and the molds thereon in opposite directions about vertical axes at the same angular velocity and bringing said molds simultaneously to the center line joining the axes of the mold carriages, a neck mold above and in register with the blank mold, means for introducing a charge of glass upwardly into the blank and neck molds and forming a parison therein, means for opening the blank mold and leaving the parison suspended from the neck mold, means for projecting the neck mold and suspended parison radially outward as they approach a transfer position during their travel with the mold carriage and then guiding the neck mold in a path such that the center line of the neck mold and parison are caused to travel in an arc concentric with the blank mold carriage and of equal radius to the arc in which the center line of the finishing mold travels about the axis of the finishing mold carriage, said arcs being substantially tangent at said center line of the mold carriages, means for closing the finishing mold around the parison, and means for opening the neck mold, the closing of the finishing mold being completed and the opening of the neck mold commenced substantially simultaneously and while the neck mold is traveling in said arc.

4. The combination of a blank mold carriage and a finishing mold carriage arranged side by side, means to rotate said carriages about vertical axes in opposite directions, a body blank mold, a neck mold in register therewith, said molds being mounted on the blank mold carriage, a finishing mold on the finishing mold carriage, said blank and neck molds being positioned to travel while in register, in an arc of shorter radius than that in which the finishing mold travels, means for forming a parison in the combined blank and neck molds, means for opening the blank mold, means for projecting the neck mold with the bare parison radially outward and causing the parison to travel in an arc concentric with the blank mold carriage and of equal radius to the arc of travel of the finishing mold center, and means for closing the finishing mold around the parison while the parison and finishing mold are traveling in said arcs of equal radius.

5. The combination of a mold carriage, means for rotating it continuously about a horizontal axis, a blank mold thereon, a neck mold carrier, a neck mold comprising separable sections pivotally mounted on the carrier, means for reciprocating said carrier radially of the mold carriage and thereby moving the neck mold into and out of a position over and in register with the blank mold, a neck pin mounted on said carrier, a neck mold opening pin mounted on said carrier, an actuating plate, said pins being brot alternately into position beneath said plate by the movement of said carrier, and means for causing said plate to actuate said pins.

6. In a machine for forming glass articles, the combination of a mold carriage rotatable about a vertical axis, a carrier mounted thereon, means for moving the carrier radially of said carriage, a neck mold comprising horizontally separable sections pivoted on said carrier, a pin mounted for up and down movement on the carrier and operable when moved downward to separate the neck mold sections, a neck pin mounted on the carrier and movable downward thereon to enter the neck mold, and an actuating device brot into operative relation to the neck pin when the carrier is moved radially inward and into operative relation to the other pin when the carrier is moved radially outward.

7. The combination of a parison mold, means cooperating therewith for forming a parison in the mold, a mold carriage rotatable about a vertical axis, a finishing mold thereon, means for transferring the parison to the finishing mold, a vertical rock shaft supported on the mold carriage, a rock arm thereon, a blowing head carried by said arm, a second rock arm on said rock shaft, a cam roll carried thereby, a stationary cam on which said roll runs, said cam shaped to rock said shaft and swing the blowing head into and out of a position over the finishing mold, said blowing head comprising telescoping sections, and means for supplying air under pressure to said head and thereby projecting the blowing head downward into engagement with the finishing mold.

LEONARD D. SOUBIER.